United States Patent

Van Wijk et al.

[11] Patent Number: 5,941,786
[45] Date of Patent: Aug. 24, 1999

[54] CONTINUOUSLY VARIABLE TRANSMISSION WITH AT LEAST TWO PUMPS CONNECTED IN SERIES/PARALLEL

[75] Inventors: Elias Van Wijk, Vleuten; Johannes Gerardus Ludovicus Maria Van Spijk, Drunen, both of Netherlands

[73] Assignee: Van Doorne's Transmissie B.V., Tilburg, Netherlands

[21] Appl. No.: 08/914,791

[22] Filed: Aug. 20, 1997

[30] Foreign Application Priority Data

Aug. 26, 1996 [NL] Netherlands ............................ 1003876

[51] Int. Cl.⁶ ............................ F16H 59/00; F16H 61/00; F16D 31/02
[52] U.S. Cl. ................................. 474/18; 474/28; 60/430
[58] Field of Search ................................... 60/430; 474/8, 474/17, 18, 28

[56] References Cited

U.S. PATENT DOCUMENTS 5,431,545  7/1995  Knight et al. ............................ 417/248

FOREIGN PATENT DOCUMENTS 0 502 263  9/1992  European Pat. Off. .
37 27 633  3/1989  Germany .
41 31 931  4/1992  Germany .
41 34 268  4/1992  Germany .
41 36 150  5/1993  Germany .

Primary Examiner—Tamara L. Graysay
Assistant Examiner—Matthew A. Kaness
Attorney, Agent, or Firm—Young & Thompson

[57] ABSTRACT

Continuously variable transmission, in particular for a motor vehicle, provided with a primary pulley mounted on a primary shaft, a secondary pulley mounted on a secondary shaft, and a drive belt running over both pulleys, each pulley formed by two sheaves, one of which is movable axially relative to the other under the influence of a hydraulic cylinder, for setting the transmission ratio, a pumping unit with at least two pumps for delivering hydraulic medium to the hydraulic cylinders, and a control unit for controlling the pump delivery depending on the operating conditions of the transmission, includes a pumping unit with at least two pumps, the first of which serves as a booster pump for the second pump connected in series, and a switch valve, under the control of the control unit, fitted so that the two pumps can be switched over from series connection to parallel connection if the volume flow of the medium required by the transmission is greater than the available volume flow in the series connection.

16 Claims, 4 Drawing Sheets

2

CONTINUOUSLY VARIABLE TRANSMISSION WITH AT LEAST TWO PUMPS CONNECTED IN SERIES/PARALLEL

BAKGROUND OF THE INVENTION

The invention relates to a continuously variable transmission, in particular for a motor vehicle, provided with a primary pulley mounted on a primary shaft, a secondary pulley mounted on a secondary shaft, a drive belt running over both pulleys, each pulley comprising two sheaves, one of which is movable axially relative to the other under the influence of a hydraulic cylinder, for setting the transmission ratio, a pumping unit with at least one pump for delivering hydraulic medium to the hydraulic cylinders, and a control unit for controlling the pump delivery depending on the operating conditions of the transmission.

DESCRIPTION OF THE RELEVANT ART

Such a continuously variable transmission is known from patent publication DE 3727633 and is used in particular in vehicles, but also has other applications. The transmission ratio of the transmission is set by axial movement of at least one of the sheaves of the pulleys, as a result of which the effective radius of the drive belt between the pulleys is changed and the transmission ratio changed accordingly. The axial movement of the sheave or sheaves is produced by means of hydraulic cylinders, to which medium is fed by way of a pumping unit. The pressure and the volume flow of the medium must at all times be such that the required axial movement of the sheaves is obtained, while the drive belt is also clamped reliably between the pulleys in such a way that no slipping can occur. The required pressure and volume flow of the medium supplied by the pumping unit can vary greatly, depending on the operating conditions, during operation of the transmission. For example, the pressure and volume flow depend on the situations in which the motor vehicle finds itself, both stationary situations with substantially constant speeds and non-stationary situations during switching actions and sudden pressure changes.

A serious problem in the case of the abovementioned continuously variable transmission, both in stationary and in nonstationary situations, is the noise level, to which the pumping unit makes an important contribution. This pump noise is caused by the pressure gradients arising while the hydraulic medium is being brought to pressure, while above a certain speed of rotation of the pump shaft noise also occurs as the result of cavitation and is then dominant, but the greatly fluctuating mechanical loads within the pumping unit also contribute to the noise.

For instance, at high speeds of the pump shaft cavitation can occur in the volume flow through the fact that the suction pressure at the inlet side of the pump falls below the vapour pressure of the medium, for example oil. Such cavitation produces not only a high and very disturbing noise level, but also greater wear on the pump in question. Moreover, pressure changes imposed by the operating conditions can occur in the medium, high pressure gradients of, for example, upwards of twenty bar occurring within a millisecond. Such pressure gradients cause noise.

BRIEF DESCRIPTION OF THE INVENTION

The object of the invention is to overcome the abovementioned problems and to indicate a solution to the abovementioned disadvantages. This is achieved according to the invention in the case of a continuously variable transmission of the type mentioned above by the fact that the pumping unit comprises at least two pumps, the first of which serves as a booster pump for the second pump connected in series.

As a result of this embodiment according to the invention, the booster pump connected in series brings the suction pressure at the inlet of the second pump above the vapor pressure of the medium. This solution ensures that the cavitation caused, and the subsequent noise production, and wear are greatly reduced. In addition, as a result of a suitable pressure distribution over both pumps, in the case of series connection the pressure gradient falling upon each individual pump can be smaller, with the result that the corresponding noise occurring is less. When more than two pumps connected in series are used, the pressure gradient falling upon each pump can be proportionately smaller.

An additional major advantage is that through use of a switch valve belonging to the pumping unit the two pumps can be switched over from said series position to parallel position if a high volume flow of the medium is needed for the transmission, for example when driving off or accelerating sharply. As a result of this parallel connection, the required high volume flow can actually be supplied by both pumps together.

It goes without saying that the at least two pumps can consist of separate pumps or of pump parts within a pump. In the latter case an additional advantage is obtained from the fact that, as a result of the series connection according to the invention, partial hydraulic balancing occurs within the pump, thereby making the resulting bearing load much lower.

It is known per se from European Application 91200987.5 to connect two pumps in parallel. Depending on the operating conditions of the transmission, the full volume flow of both pumps connected in parallel or the volume flow of only one of the pumps can be used, while the other is switched off completely. For this purpose, it is possible to use a control valve by means of which the other pump to be switched off is rendered pressureless if there is no need for a delivery from this pump for the transmission. This switching is used only to obtain better efficiency in energy consumption through the fact that medium is no longer needlessly circulated.

BRIEF DESCRIPTION OF THE DRAWINGS

The invention will be explained in greater detail on the basis of an exemplary embodiment with reference to the drawings, in which.

DESCRIPTION OF THE PREFERRED EMBODIMENT

Figure 1:
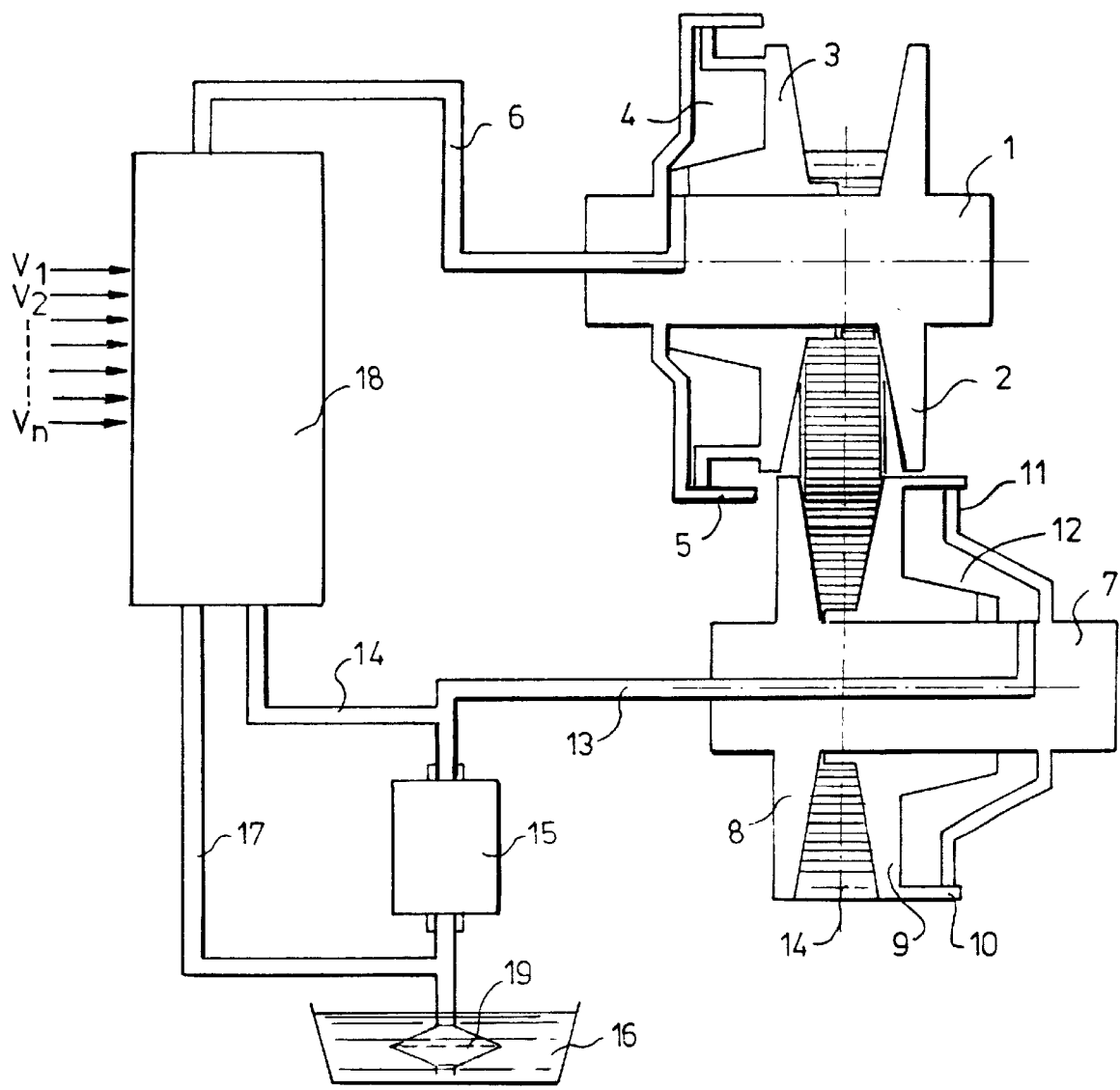
FIG. 1 gives a diagram of a continuously variable transmission from the prior art.

FIG. 1 shows a hydraulic/mechanical continuously variable transmission for a motor vehicle as known from the prior art. However, it will be clear that the present invention can be used in a corresponding manner in other types of continuously variable or automatic transmissions which are controlled by electronic, hydraulic or other means.

The continuously variable transmission comprises a primary shaft 1, for example driven by an engine of a vehicle, on which shaft a primary pulley is fitted, which pulley consists of a fixed and a movable conical sheave 2, 3. The sheave 3 is coupled to the piston of a hydraulic cylinder 5 which encloses the cylinder space 4. The sheave 3 can therefore be moved by supply or discharge of medium by way of the line 6. The transmission also comprises a secondary shaft 7, which is connected, for example by way of couplings, to the wheels of the vehicle. The shaft 2 is also provided with a secondary pulley, consisting of a fixed and an axially movable conical sheave 8, 9. The sheave 9 is integrally coupled to the hydraulic cylinder 10, in which the piston 11 is connected to the secondary shaft 7, whereby the cylinder space 12 is enclosed. Medium can be supplied to and discharged from the space 12 by way of the line 13. An endless transmission element, such as a push belt or chain or the like, is fitted over the primary and secondary pulleys. The radius of the drive belt 14, and therefore the transmission ratio, can be varied by moving the conical sheaves 3 and 9 axially. The axial movement of the conical sheaves is produced by supply or discharge of medium to or from the cylinder spaces 4 and 12. The medium in the cylinder space 12 must be able to exert sufficient pressure on the belt 14 to prevent slipping of the belt between secondary and primary pulleys.

The pressure and the volume flow in the lines 6 and 13 to the cylinder spaces 4 and 12 are controlled by the control unit 18. The control by the control unit 18 occurs depending on a multiplicity of variables (V1–Vn), such as the transmission ratio i, the speed of rotation of the primary ($n_p$) and secondary ($n_s$) shafts, the vehicle speed v, accelerations $\alpha 1$ and decelerations $\alpha 2$ of the vehicle, position $\beta$ of the accelerator, and temperature T of the medium. Medium is supplied to the control unit 18 by way of a line 14 from a pumping unit 15 which is connected by way of a filter 19 to the reservoir 16. The medium can be kept at a particular pressure by means of the pumping unit 15. Any excess medium is returned by the control unit by way of the discharge line 17 to the reservoir 16 or to the pumping unit 15. Of course, pressure and/or flow regulating valves which interact with the lines 6 and 13 respectively leading to the primary and secondary pulleys can be provided in the control unit.

In certain operating conditions of the motor vehicle, such as at high engine speeds, high speeds of rotation of the pump shaft can also occur. Where the pumping unit consists of a single pump, the abovementioned problem will then occur, namely that cavitation in the volume flow occurs as a result of the fact that the suction pressure at the inlet side of the pump becomes lower than the vapor pressure of the medium. This produces vapor bubbles which do not have time to dissolve gradually when the medium is placed under pressure, but, on the contrary, implode. This produces not only a high and disturbing noise level, but also greatly increased wear. The abovementioned problem of a steep pressure gradient falling upon the single pump can also occur, again resulting in a disturbing noise level.

In the case of the solution according to the invention a separate booster pump is now connected in series in the pumping unit 15 of FIG. 1. The medium, for example oil, from the reservoir 16 is consequently brought to a low pressure of, for example between 1 and 1.5 to 2 bar by the booster pump. The delivery side of the first or booster pump is connected to the suction side of the second pump, which therefore has a suction pressure which is higher than the suction pressure of the first or booster pump. The second pump takes the medium further to the pressure level of, for example, 8 to 80 bar required by the transmission. However, the design can also be such that the medium is brought by the first pump to a higher pressure which is, for example, half or another partial value of the final pressure required at the outlet or delivery side of the pumping unit, and that the second pump provides the other half or completing partial value of the pressure increase.

Figure 2:
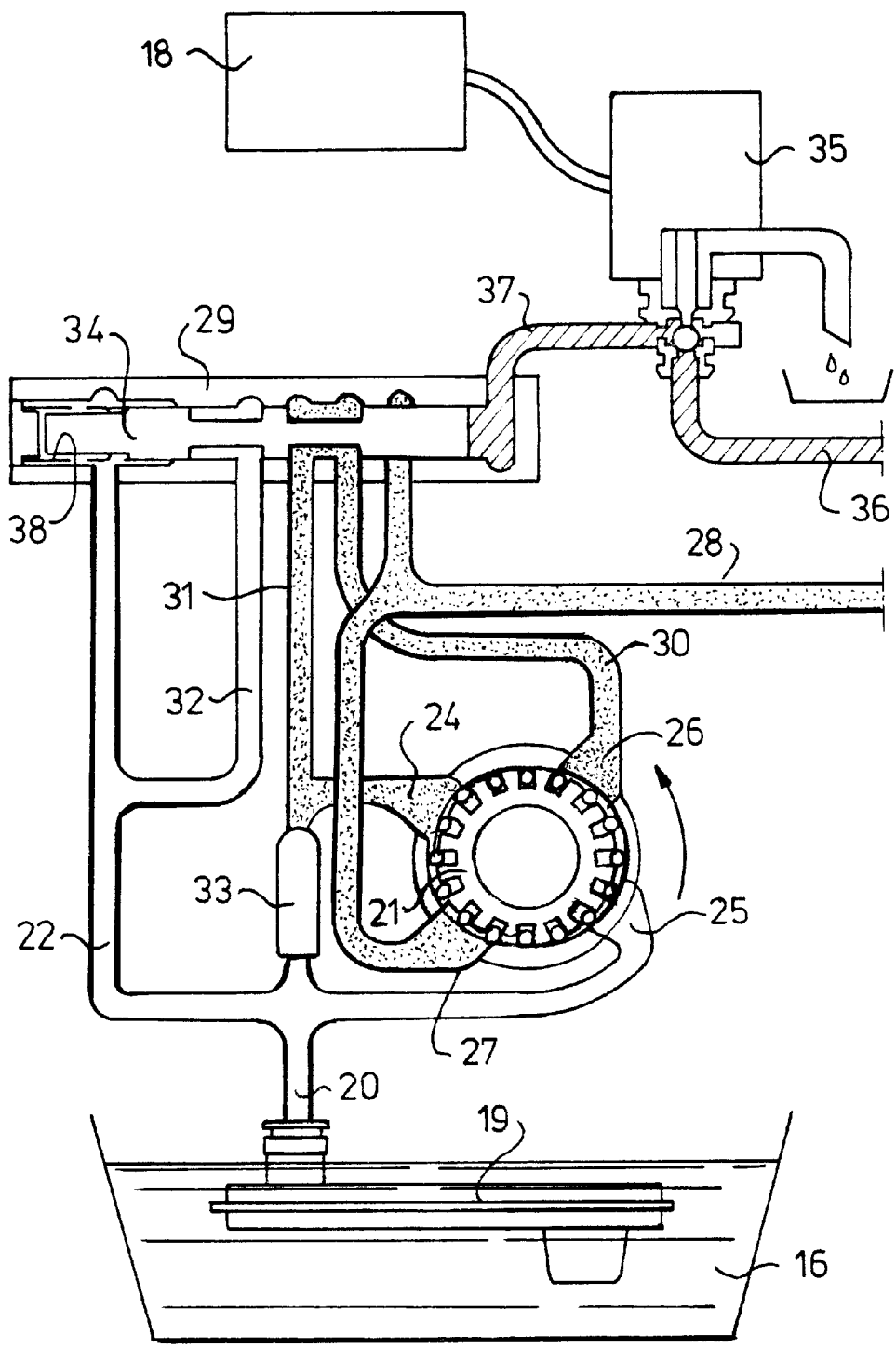
FIG. 2 gives a diagram of the pumping unit according to the invention, with two pumps connected in series.

FIG. 2 shows an embodiment according to the invention. This embodiment shows the abovementioned case where the first or booster pump and the second pump consist of pump parts of one pump, i.e., one pumping unit. This pump 21 sucks medium by means of the pump part 25, 26 out of the reservoir 16 by way of the filter 19 and line 20 to inlet 25. From the outlet 26 the medium is pumped on at a low pressure such as 1.5 to 2 bar to the switch valve 29 by way of the line 30. Owing to the fact that the switch valve 29 is in the switching position shown in FIG. 2, in which the switching element 34 is taken into the left-hand position against the spring pressure of the spring 38 by the oil pressure in the line 37, the medium is supplied from the line 30 by way of the line 31 to the inlet 24 of the pump part 24, 27. In the outlet line 28, the medium supplied under low pressure is brought by the second pump part to the higher pressure required for the transmission.

The pressure level present in the line 28 at the delivery side of the pump part 24, 27 is regulated in this series connection by a pressure-regulating valve of the transmission, not shown in any further detail.

It goes without saying that in this series position the delivery pressure of the first or booster pump must be greater by a certain minimum value than the vapor pressure of the medium, in order to prevent vapor bubbles from occurring in the suction path of the second pump. This means that no cavitation can occur in the second pump, so that the noise level of the pumping unit is reduced at high speeds and wear is prevented. If this first or booster pump has a greater stroke volume than the second pump (inter alia, necessary on account of possible leakage losses in the first pump), the excess medium can be discharged by way of a one-way valve or pressure-regulating valve to the reservoir or to a channel at low pressure, such as a lubricating circuit or cooling circuit of the transmission. In the figure this pressure-regulating or one-way valve 33 is accommodated in the line connecting to the suction line 20.

When a one-way valve 33, for example a ball valve, is used, the pressure level at the delivery side of the first pump part can also be regulated. The valve 33 in this case can be a simple ball valve, by means of which the pressure at the outlet or delivery side of the first pump is set to, for example, 1.5 to 2 bar. However, the valve can also be an internally or externally adjustable pressure-regulating valve by means of which the pressure at the delivery side of the first pump is brought to a value in a range of, for example, 4 to 40 bar, while the second pump ensures that the remaining pressure increase is brought to a value in a range of, for example, 8 to 80 bar. The pressure-regulating valve 33 can in this case be set from the control unit 18 by way of a connection which is not shown in any further detail. The valve can also be fitted between the suction line 24 and the suction line 25 in the pump housing of the two pump parts or in the switching element 34 of the valve 29.

Figure 3:
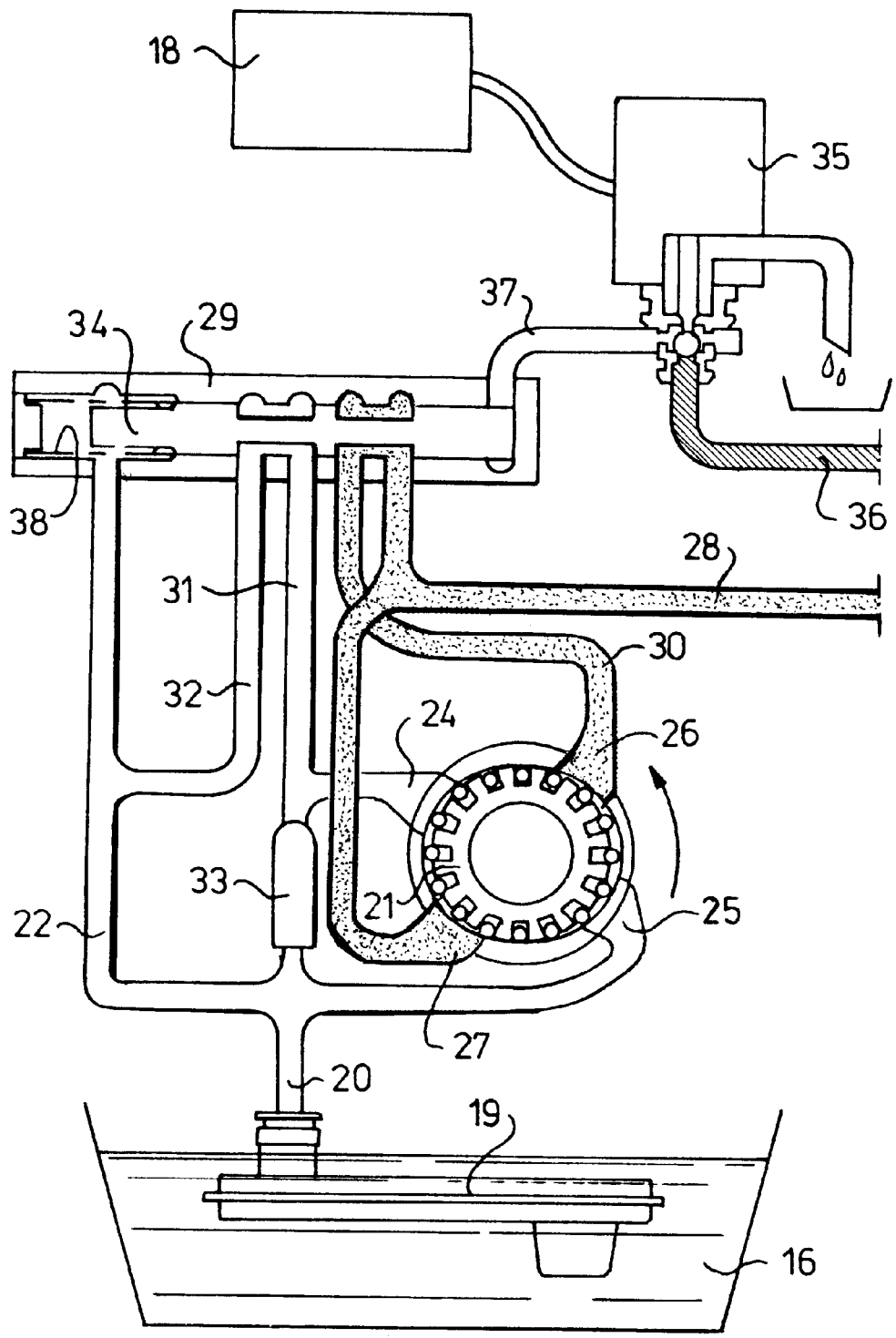
FIG. 3 gives a diagram of the pumping unit according to the invention, with two pumps connected in parallel.

If in certain operating conditions the abovementioned series connection gives too little output to be able to meet the requirement of the transmission, in particular at lower speeds of rotation, when cavitation problems do not play a role, the switch valve 29 is set in the right-hand position indicated in FIG. 3 under the influence of the control of the control unit 18.

For this purpose, the oil supply in the line 36 is shut off, possibly by way of an on/off solenoid 35, so that the spring force on the left-hand side of the switch valve 29 takes over and forces the switching element 34 into the right-hand position. In this embodiment, as indicated in FIG. 3, the supply line 20 is connected both to the inlet 25 and to the inlet 24 by way of the diversion 22, 32 and 31. In this parallel connection the suction line or inlet of the first or booster pump 25, 26 is therefore connected to the suction line or inlet of the second pump part 24, 27. The delivery line or outlet of the first or booster pump is also connected to the delivery line or outlet of the second pump. In the case of this parallel connection, which is necessary only in a small part, for example 5%, of the total operating time, a high volume flow is provided. As in the case of the series connection in FIG. 2, the pressure level at the delivery side of the first and second pump parts in the line 28 is regulated by a pressure-regulating valve of the transmission which is not shown in any further detail.

Figure 4:
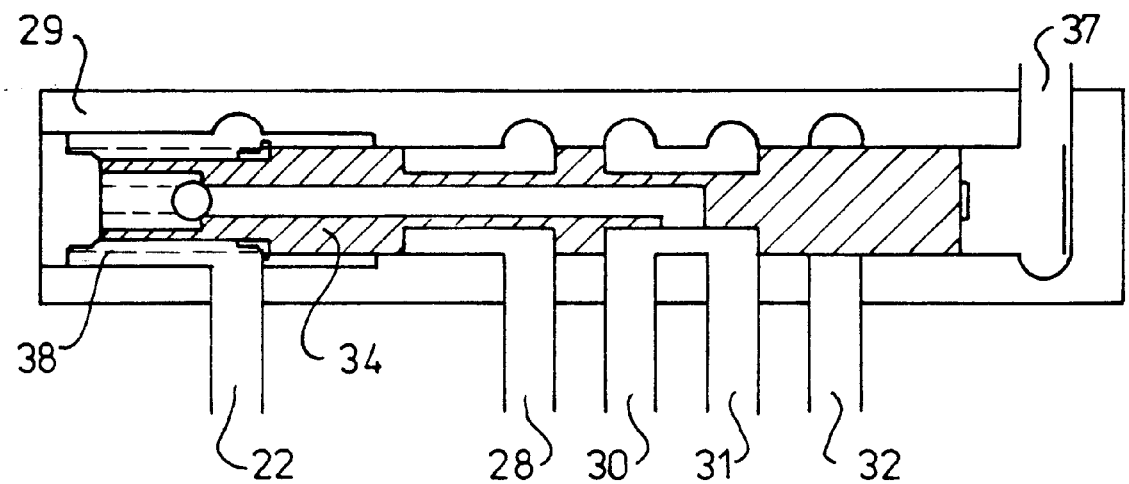
FIG. 4 shows a section of a variant of the switch valve from the embodiments of FIGS. 2 and 3.

FIG. 4 shows a section of a variant of the switch valve 29, in which the abovementioned pressure-regulating valve of the first pump is accommodated as a ball valve 39 in the switching element 34. It goes without saying that the valve 33 shown in FIGS. 2 and 3 then becomes unnecessary. In addition, the lines 28, 30, 31 and 32 must be connected to the valve 29 in a different sequence.

The individual pumps or pump parts can be designed with a constant or with a variably adjustable stroke volume. The pumps or pump parts can either be driven directly or by way of a coupling with a specific transmission ratio by a drive unit such as the internal combustion engine of the motor vehicle. It is also possible to drive at least one of the individual pumps electrically.

Figure 5:
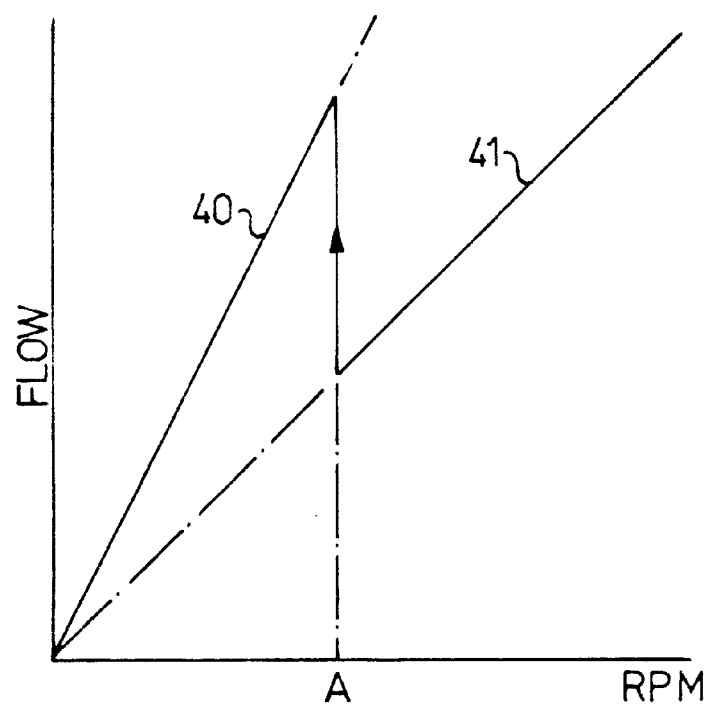
FIG. 5 shows a graph as an example of the volume flow belonging to the embodiments of FIGS. 2 and 3 as a function of the pump speed.

FIG. 5 shows the volume flow or delivery of the pumping unit as a function of the speed of rotation of the pump shaft. In this figure the line 40 indicates the volume flow delivered by the two pumps connected in parallel (for example, in 1/min), while the line 41 indicates the volume flow delivered by the two pumps connected in series. If, as mentioned earlier, a higher output is necessary, it is possible to switch over from series to parallel connection, as shown, for example, at speed of rotation A.

We claim:

1. Continuously variable transmission comprising:

a primary pulley mounted on a primary shaft, a secondary pulley mounted on a secondary shaft, a drive belt running over both pulleys capable of transmitting torque between said pulleys, wherein the pulleys each comprise a hydraulic cylinder and two sheaves, one of which is movable axially relative to the other under the influence of the hydraulic cylinder for setting the transmission ratio, a pumping unit with at least two pumps or pump parts, each having a suction side and a delivery side delivering hydraulic medium of the hydraulic cylinders, switching means including a switch valve for switching said pumps or pump parts between a parallel connection and a series connection wherein one of said pumps or pump parts serves as a booster pump for said other pump or pump part, discharging means capable of discharging excess medium delivered by said booster pump, and a control unit controlling the switching means depending on operating conditions of the transmission.

2. Continuously variable transmission according to claim 1, provided with a pressure-regulating valve which is connected to the outlet of the first pump, for regulation of the pressure at the first pump and discharge of surplus medium from the first pump.

3. Continuously variable transmission according to claim 2, in which the control unit controls the pressure setting of the pressure control valve.

4. Continuously variable transmission according to claim 2, in which the pressure-regulating valve is fitted in the pump housing of one of the first and second pumps.

5. Continuously variable transmission according to claim 2, in which the pressure-regulating valve is fitted in the switch valve.

6. Continuously variable transmission according to claim 2, in which the pressure-regulating valve is in the form of a one-way valve.

7. Continuously variable transmission according to claim 2, in which the discharge of excess medium from the first pump is returned to a channel at low pressure.

8. Continuously variable transmission of claim 7, wherein said channel is one of a lubricating circuit and a cooling circuit of the transmission.

9. Continuously variable transmission according to claim 1, in which the first and second pumps can be either separate pumps or pump parts within a pump.

10. Continuously variable transmission according to claim 1, in which one or both of the first and second pumps are either driven directly or by way of a transmission with a specific transmission ratio by a drive motor of the motor vehicle.

11. Continuously variable transmission according to claim 1, in which at least one of said first and second pumps is driven electrically.

12. Continuously variable transmission according to claim 1, in which the first pump has a greater stroke volume than the second pump.

13. Continuously variable transmission according to claim 1, in which the first and second pumps have an adjustable stroke volume.

14. Continuously variable transmission according to claim 1, in which the pumping unit comprises three or more pumps.

15. A continuously variable transmission, comprising:

a primary pulley mounted on a primary shaft, a secondary pulley mounted on a secondary shaft, a drive belt running over both said pulleys, each of said pulleys comprising two sheaves, one of said two sheaves being movable axially relative to the other of said two sheaves under the influence of a hydraulic cylinder, for setting the transmission ratio, a pumping unit with at least one pump for delivering hydraulic medium to said hydraulic cylinder, and a control unit for controlling the pump delivery depending on the operating conditions of the transmission, said pumping unit comprising at least a first and second pump, the first pump serving as a booster pump boosting the inlet pressure for the second pump, said first and second pumps being connected in series.

16. Continuously variable transmission according to claim 15, further comprising a switch valve by means of which, under the control of the control unit, the two pumps can be switched over from series connection to parallel connection if a volume flow of the medium required by the transmission is greater than an available volume flow in the series connection.

\* \* \* \* \*